United States Patent
Brazzel

(10) Patent No.: US 7,635,667 B1
(45) Date of Patent: Dec. 22, 2009

(54) MULTI-COMPONENT DRILLING FLUID ADDITIVE, AND DRILLING FLUID SYSTEM INCORPORATING THE ADDITIVE

(75) Inventor: Ronald L. Brazzel, Lafayette, LA (US)

(73) Assignee: Ambar Lonestar Fluid Services, LLC, Layfayette, LA (US)

( * ) Notice: Subject to any disclaimer, the term of this patent is extended or adjusted under 35 U.S.C. 154(b) by 382 days.

(21) Appl. No.: 11/107,431

(22) Filed: Apr. 15, 2005

Related U.S. Application Data

(60) Provisional application No. 60/562,472, filed on Apr. 15, 2004.

(51) Int. Cl.
*C09K 8/12* (2006.01)
*C09K 8/58* (2006.01)

(52) U.S. Cl. .................. 507/134; 507/135; 507/136; 507/138; 507/140; 507/252; 507/260; 507/261; 507/265; 507/267; 507/269

(58) Field of Classification Search ............ None
See application file for complete search history.

(56) References Cited

U.S. PATENT DOCUMENTS

| | | | | |
|---|---|---|---|---|
| 3,461,068 A | * | 8/1969 | Peacock | 507/136 |
| 4,257,902 A | * | 3/1981 | Singer | 508/185 |
| 4,374,737 A | * | 2/1983 | Larson et al. | 507/130 |
| 5,096,883 A | * | 3/1992 | Mercer et al. | 507/103 |
| 5,318,956 A | * | 6/1994 | Mueller et al. | 507/139 |
| 5,403,822 A | * | 4/1995 | Mueller et al. | 507/138 |

* cited by examiner

*Primary Examiner*—James Seidleck
*Assistant Examiner*—John J Figueroa
(74) *Attorney, Agent, or Firm*—Law Office of Jesse D. Lambert, L.L.C.

(57) ABSTRACT

Multi-component additive for incorporation into a drilling fluid, and a drilling fluid system comprising said multi-component additive. The additive preferably comprises three primary components: (1) a rate of penetration enhancer, namely one of a number of synthetic (non-toxic) ester-based or olefin-based oils as a carrier for other additives, such as surfactants; (2) a lubricant, namely one or more of a number of chlorinated waxes, chlorinated olefins, and plant based fatty acids; and (3) a clay inhibitor/stabilizer, such as a polyglycol. Preferably, the three components are pre-mixed in a single container, for ease in use in adding to a drilling fluid system. The additive may be incorporated into a drilling fluid system at a shore based facility, and the "liquid mud" transported to a drilling rig; or the additive may be brought to the drilling rig and incorporated into a drilling fluid system on site.

9 Claims, No Drawings

MULTI-COMPONENT DRILLING FLUID ADDITIVE, AND DRILLING FLUID SYSTEM INCORPORATING THE ADDITIVE

CROSS REFERENCE TO RELATED APPLICATIONS

This regular patent application claims priority to provisional patent application Ser. No. 60/562,472, filed Apr. 15, 2004.

BACKGROUND

1. Field of the Invention

This invention relates to drilling fluids commonly used in the drilling of earthen boreholes, especially for the exploration for and production of oil and gas. More particularly, this invention relates to a drilling fluid system which possesses desirable attributes regarding rate of penetration enhancement, lubrication, and clay inhibition, and further relates to a multi-component additive for drilling fluids, preferably pre-blended into a "single-container" additive for ease and efficiency in use, which specifically addresses rate of penetration, lubrication, and clay inhibition properties of the overall drilling fluid system.

2. Description of the Related Art

The present invention comprises a particular composition of water based drilling fluid (for fresh or salt water based systems) for use in the drilling of subterranean boreholes, commonly referred to as "wells." The invention further comprises an additive for drilling fluids which comprises three primary components, directed toward improving the efficiency of the overall system.

The use of liquid drilling fluids, commonly known as "muds," is well known in the art. In particular, this invention is directed toward drilling fluid systems used in the rotary drilling of wells, where a drill string is rotated, in turn rotating and applying weight to a drill bit, which drills through the downhole formation. Mud is pumped downhole through the drill string, through the drill bit, and circulated up the drill string/borehole annulus back to the surface.

Drilling fluids serve several fundamental functions: control of downhole formation pressures; removal of cuttings generated by the drill bit from the borehole; and cooling and lubricating of the drill bit. In addition to these fundamental functions of drilling fluids, drilling fluids preferably possess several desirable characteristics which can greatly enhance the efficiency of the drilling operation. Preferably, the drilling fluid exhibits rate of penetration enhancement characteristics, by having physical properties which "wet" the drill string and keep the cutting surfaces of the drill bit (whether of the roller cone or other configuration) clean. The "wetting" attribute is at least in part a function of the surface tension of the fluid. The drilling fluid also preferably has a high degree of lubricity, to minimize friction between the drill string and the wall of the borehole, an extremely valuable result being the minimizing of differential sticking (a situation in which the hydrostatic pressure of the drilling fluid column is sufficiently higher than the formation pressure, that the drill string is forced against the wall of the borehole and stuck). Yet another desirable characteristic is inhibition (that is, prevention from swelling) of formation solids (primarily clays and shales), which further reduces incidents of drill string sticking, under-gauge holes, etc. Inhibition of clay swelling, in general, results from preventing the clays from adsorbing water.

The prior art has addressed, to some degree, these characteristics of drilling fluids in a piece meal fashion, with various products having been developed over the years which are directed toward (for example) one of the three desirable attributes. It can be readily appreciated that overall efficiency of the drilling fluid system is best achieved by incorporating all three of these attributes, into the system.

The present invention is a aqueous based drilling fluid system which comprises (in addition to the water phase, weighting material if any, and common components such as gelling materials) three primary additive components, of particular compositions and in preferred volumetric ratios of the three primary additive components one-to-the-other and within the overall drilling fluid system, which perform each of these desired functions (rate of penetration enhancement, lubrication, and clay inhibition). In addition, in a preferred embodiment, the invention comprises a drilling fluid additive in which the three primary components are "pre-blended" in a recommended ratio, one to the other, with the pre-blended additive thereafter added to a drilling fluid system to achieve a desired concentration of additive within the overall drilling fluid system.

SUMMARY OF THE INVENTION

The present invention comprises an aqueous base drilling fluid comprising three additives to address different desirable attributes of the drilling fluid. In addition, the invention comprises a multi-component drilling fluid additive, wherein the additive is preferably pre-blended into a "single container" additive package, for ease and efficiency in incorporating the additive into a drilling fluid system, whether done at a mixing facility and the resulting pre-mixed mud brought to the drilling rig, or whether the additive is brought to the drilling rig and incorporated into the drilling fluid system on site.

The additive of the present invention preferably comprises three primary components, for incorporation into a drilling fluid system: (1) a-rate of penetration enhancer; (2) a lubricant; and (3) a clay inhibitor/stabilizer. The rate of penetration enhancer component may comprise one of a number of synthetic (non-toxic) ester-based or olefin-based oils as a carrier for other additives, such as surfactants. The lubricant may comprise one or more of a number of chlorinated waxes, chlorinated olefins, and plant based fatty acids. The clay inhibitor/stabilizer may comprise a polyglycol of many types, known in the drilling fluid art.

DETAILED DESCRIPTION OF THE PRESENTLY PREFERRED EMBODIMENT

The invention disclosed herein is an aqueous base drilling fluid system comprising multiple additives to enhance the functionality of the system, and a multi-component drilling fluid additive, along with a resulting drilling fluid system and method of using same in the drilling of wells, whether for oil and gas exploration and production or any other purpose. Those skilled in the relevant art will be familiar with the general setting within which drilling fluids (commonly called "muds") are used in the rotary drilling art.

The drilling fluid system of the present invention comprises at least two fundamental components of an aqueous or water based drilling fluid. Such fundamental and typical components of water based drilling fluids comprise (1) the water fraction; (2) a weighting agent such as barite, if the mud is used in an over-pressured environment; and (3) typically a gelling agent such as bentonite or other similar clay.

In addition to such fundamental components, and without exclusion of other components which may be added as a matter of course to water based drilling fluids, the present drilling fluid system comprises the following components (in preferred compositions and concentrations within the drilling fluid, as described in more detail hereafter):

1) a rate of penetration enhancer;
2) a lubricant; and
3) a clay inhibitor/stabilizer.

While different ways of handling the additive and incorporating it into the drilling fluid are possible, a preferred manner is to combine the three components into a blended "single container" additive, and thereafter add the blended additive to a drilling fluid system. This manner of handling very much eases the task of incorporating the additive into the drilling fluid system, automatically maintains the ratios of the additives one to the other as desired, and makes it easier to maintain the desired volumetric ratios of the three components within the system (that is, the volumetric ratios of the three components as compared to the overall volume of drilling fluid).

Presently Preferred Embodiment(s) of the Rate of Penetration Enhancer Component

Generally, the rate of penetration ("ROP") enhancer component may comprise one of a number of synthetic, non-toxic, ester-based or olefin-based oils as a carrier for other additives, such as surfactants. More generally, the ROP enhancer component encompasses a plurality of rate of penetration enhancers comprising one or more surfactants and polymers, in a synthetic base oil carrier, such as a synthetic based olefin or ester. Preferably, the ROP enhancer component is non-toxic, contains no aromatics, and passes the static sheen test as prescribed by regulatory authorities. Typically, the component takes the form of a clear, amber colored liquid, with little or no discernable odor.

One suitable rate of penetration enhancer component comprises a synthetic ester-based oil, with or without added surfactants, which oil exhibits the following carbon chain composition analysis:

| Carbon Range | % of total |
| --- | --- |
| C14 and under | 0.4 |
| C14-C16 | 2.5 |
| C16-C18 | 6.8 |
| C18-C20 | 12.4 |
| C20-C22 | 16.8 |
| C22-C24 | 18.4 |
| C24-C26 | 17.5 |
| C26-C28 | 13.9 |
| C28-C30 | 7.2 |
| C30 and up | 4.1 |
| Total | 100 |

Further, typical physical properties of a suitable synthetic ester-based oil, as the rate of penetration enhancer component, are:

| | |
| --- | --- |
| Specific gravity | 0.81-0.83 |
| Odor | Mild to none |
| Flash point | >200 F. |
| Pour point | −5 to 5 F. |
| Solubility in water | negligible |
| Appearance | Clear, light colored liquid |

It is understood that various types of olefin-based synthetic oils are also suitable.

As mentioned above, in addition to the primary part of the ROP enhancer component, namely the base oil thereof, the ROP enhancer component may additionally be supplemented with and comprise surfactants and polymers of types known in the relevant art, to enhance wetting of the drill string and bit cleaning, etc. Surfactants as encompassed by the present invention may comprise those from the family of polyamide, polyamine or imidazoline derivatives. Preferably, surfactants suitable for use in the present invention have an HLB (Hydrophilic Lipophilic Balance) number in the range that describes them as an efficient metal wetter and is effective in reducing interfacial tension. The HLB number for wetting type surfactants is generally described as being between 7 and 9 on a scale of 1 to 18. It is to be understood that the actual HLB for the surfactants suitable for use in preferred embodiments of the rate of penetration enhancing component could be outside this range (7 to 9).

One possible, acceptable, and presently commercially available rate of penetration enhancer which a preferred embodiment is available from Multi-Chem, Inc., P.O. Box 728, Abbeville, La., 70511 and is sold under the trade name AQUA-SPOT-S™.

Presently Preferred Embodiment(s) of the Lubricant Component

Generally, the lubricant may comprise one or more of a number of chlorinated waxes, chlorinated olefins, and plant based fatty acids. While not restricting the scope of the lubricant component to any particular composition, one presently preferred composition is that disclosed in U.S. Pat. No. 4,517,100 to Nance et al, issue date May 14, 1985. The disclosure of U.S. Pat. No. 4,517,100 is incorporated by reference herein for purposes of disclosing further detail on the composition of at least one presently preferred lubricant composition.

In accordance with the disclosure of U.S. Pat. No. 4,517,100, the lubricant component may comprise a mixture of: (a) a chlorinated component of chlorinated normal paraffins having 9 to 20 carbon atoms, chlorinated esters of fatty acids, chlorinated waxes, chlorinated olefins or mixtures thereof; and (b) a sulfurized component of sulfurized fatty acid, sulfurized esters of fatty acids, sulfurized polymerized fatty acids, sulfurized olefins, or mixtures thereof, the chlorinated and sulfurized components being combined in proportions to produce a lubricating composition containing about 15 to 30 weight percent chlorine and 2 to 10 weight percent sulfur. For purposes of this disclosure, the term "esters of fatty acids" includes the esters derived from glycerol, i.e. the triglycerides of fatty acids. For purposes of this disclosure, the term "waxes" includes both slack waxes and refined waxes. One possible, acceptable, and presently preferred embodiment of the lubricant component of the present invention is commercially available from Keil Chemical, Dept. L 2566, Columbus, Ohio 43260 (or the related company Dover Chemical, 3676 Davis Road N.W., Dover, Ohio, 44622-0040), and is sold under the trade name of OA-900.

It is to be understood, however, that the lubricant component may comprise, more generally, chlorinated waxes, chlorinated olefins, and plant based fatty acids, and the scope of the invention is not limited to the specific lubricant composition set out above.

Presently Preferred Embodiment(s) of the Clay Inhibitor/Stabilizer Component

Generally, the clay inhibitor/stabilizer component may comprise a polyglycol of many types, well known in the drilling fluid art. For purposes of this patent application, the term "clay" is understood to encompass all formations which have a tendency to absorb water and thereby swell, whether they are termed "clays," "shales," etc. In particular, while not limiting the scope of the invention to any particular polyglycol, one acceptable and presently preferred polyglycol is an industrial propylene glycol having substantially the following properties:

| Test Method | Test | Result |
|---|---|---|
| ASTM D1613 | Acidity, as Acetic Acid, wt. % | 0.0003 |
| Visual | Appearance | Clear, viscous liquid |
| G.C. | Assay, wt. %. | 99.80 |
| USP XXI | Chlorides, ppm | <0.5 |
| ASTM D1209 | Color, APHA | 5 |
| ASTM D1078 | Distillation, ° C. | |
| | IBP | 187.1 |
| | DP | 188.6 |
| USP 231 | Heavy metals as Pb, ppm | <5 |
| ASTM E394 | Iron, ppm | 0.25 |
| ASTM E202 | Water, wt. % | 0.0181 |
| ASTM D2849 | Suspended matter | Substantially free of suspended matter |
| ASTM D4052 | Specific gravity 20/20° C. | 1.0375 |
| ASTM D1218 | Refractive index, 25° C. | 1.4314 |

Propylene glycols which satisfy the test properties above are commercially available from a variety of commercial suppliers. It is understood that other propylene glycols may serve as the clay inhibitor/stabilizer component of the drilling fluid system.

Method of Blending the Components of the Multi-Component Additive

While various methods of blending the three primary components of the multi-component additive of the present invention may be suitable, empirical uses have resulted in one presently preferred method as set out below. It is important that the three components are blended so as to achieve an even distribution of the components in the desired concentrations in the final product.

The components are blended in batches of approximately 4200 gallons (or 100 bbl in typical oilfield measurements). Blending is carried out in a stainless steel blending tank, as is known in the art for mixing organic materials in a liquid form. The components are introduced to the tank through a hopper, and circulated through an eductor type shearing unit powered by a centrifugal pump. Shearing provides improved mechanical blending of the components such that the resulting product is evenly distributed in the desired ratios as set out herein. The centrifugal pump is sized according to the suction and discharge lines of the mixing unit and the requirements of the shearing device. Blending and shearing of the mixture typically requires 30 to 60 minutes, and results in a slight exothermic reaction due to the shear type and time. The resulting additive is then transferred to appropriate packaging (from 55 gallon containers up to 25 barrel bulk volume tanks) for delivery, for example to a wellsite. Other blending procedures that achieve a uniform mixture of the three components may be suitable.

Preferred Ratios of Components of the Pre-Blended Additive

Empirical testing has resulted in desired ratios of the three primary components of the additive, one to the other. Expressed in terms of volumetric fractions of the pre-blended additive, one presently preferred embodiment comprises 4 parts by volume of the rate of penetration enhancer; 2 parts by volume of the lubricant; and 2 parts by volume of the clay inhibitor. By way of example, then, a volume of 8 barrels of the pre-blended additive would comprise 4 barrels of the rate of penetration enhancer; 2 barrels of the lubricant; and 2 barrels of the clay inhibitor. However, it is understood that different wellbore applications could result in variations of the volumetric fractions. For example, a very high angle wellbore may dictate a higher relative fraction of lubricant. Depending upon the specific applications, the additive may comprise volumetric ratios of the different components as follows:

| | |
|---|---|
| Rate of penetration enhancer | 4 parts to 10 parts |
| Lubricant | 2 parts to 6 parts |
| Clay inhibitor | 2 parts to 6 parts |

It is understood that the ranges set forth herein are by way of example only, and the invention encompasses blends with ratios greater than and less than those specifically set out above.

The pre-blended aspect of the additive confers significant and novel advantages in its use. Once a desired specific ratio is blended, then additions of the additive with that ratio to a drilling fluid system are very much simplified, and the pre-blending eases maintenance of the desired volumetric concentrations in the system for uniform dispersion throughout the system. In addition, in order to maintain the preferred volumetric fraction of the additive within the overall system (as addressed below), particularly in the case of unusual wellbore and drilling conditions (lost circulation, volume increases due to hole washout, etc.), the pre-blended additive permits quick addition to the overall system, as opposed to adding each component singly Preferred Volumetric Fractions (Compositions) of the Drilling Fluid The drilling fluid system may comprise a range of acceptable and desirable volumetric fractions of the various components, as a fraction of the total drilling fluid system volume. Field testing has shown that the following volumetric fractions of the three components identified above, result in the desired favorable characteristics:

| Component | Low end of range, volumetric % of total system volume | High end of range, volumetric % of total system volume |
|---|---|---|
| Rate of penetration enhancer | 4 | 10 |
| Lubricant | 2 | 6 |
| Clay inhibitor | 2 | 6 |
| Totals | 8 | 22 |

It is to be understood that the scope of the present invention comprises drilling fluid systems having volumetric fractions above and below the exemplary ranges set forth above.

Factors which are considered in order to determine the appropriate volumetric fractions of the various components, for a given system, include the geometry of the wellbore; the depth of the well; downhole temperatures; and characteristics of the formations being drilled, including but not limited to the nature of the clays and other components of the formations. It is to be further understood that the drilling fluid system is amenable to use with both high pH and low pH systems, and further that the invention encompasses both "fresh water" and "salt water" based drilling fluid systems.

One composition of the drilling fluid of the present invention comprises the water (aqueous) phase of the fluid having a chloride concentration of between 500 mg/l and 5000 mg/l expressed as sodium chloride salinity. This level of salinity is considered a "fresh water" formulation with a weight percent of sodium chloride less than 1%, and the resultant salinity in native state. The salinity achieves this concentration from waters provided at the origin of mixing, such as a shorebase liquid mud plant or from the wellsite during drilling operations. The salinity may increase to the higher concentration due to leaching of waters from downhole formations. This increase is normal and efforts to alter this salinity are usually not required.

A second composition of the drilling fluid of the present invention comprises the water phase of the fluid having a chloride concentration of near saturation to saturation such that the chloride concentration is between 150,000 mg/l and 189,000 mg/l expressed as sodium chloride salinity. This level of salinity is considered a "saturated salt" formulation with a weight percent of sodium chloride between 22% and 26%. This concentration is maintained with regular additions of dry sodium chloride to the circulating drilling fluid. This salinity is maintained for the purpose of drilling "sub-salt" formations in deepwater environments, for example in the Gulf of Mexico, and preventing these formations from eroding during drilling. It is understood that the multi-component additive of the present invention is compatible with both fresh water and saturated salt water drilling fluids.

Method of Using the Drilling Fluid System

The method of the present invention comprises mixing a drilling fluid system, comprising a water based drilling fluid, and further comprising the rate of penetration, lubricant, and clay inhibition components in accordance with the volumetric ranges set forth above; and pumping the drilling fluid from tanks on the rig, down the drillstring and returning the drilling fluid up the drillstring/borehole and drillstring/casing annulus to the tanks, for processing and re-pumping in the cycle well known to those having skill in the relevant art area. In a preferred embodiment, the components of the drilling fluid are mixed in a mix facility away from the drilling rig (e.g., at a shorebase facility, from which offshore based drilling rigs are serviced), and whole or "liquid mud" is brought to the rig in tanks. It is possible, however, to compose the drilling fluid of the present invention by mixing the components on the rig, and the scope of the invention encompasses the resulting drilling fluid regardless of how or where the fluid is mixed.

It is to be further noted that the drilling fluid system of the present invention may be formed by adding the components disclosed herein, singly, to the system; or in a preferred embodiment, the three components are blended together in desired ratios to form a multi-function and purpose additive, and that pre-blended additive incorporated with the overall drilling fluid system. Which of the two mixing approaches to use is dependent upon various parameters related to the actual well conditions.

Case Histories Illustrating Use of Presently Preferred Embodiments of the Invention The following are several case histories (wells which have been drilled) which have borne up the utility of the present invention, which has yielded unexpected and favorable results, and attendant significant time and cost savings.

Case History No. 1

The subject well was an offset well to one drilled with a diesel base mud, where approximately 4,000 barrels of mud were lost and planned total depth of the well was never reached. The well history on the subject well was as follows:

Wellbore displaced to a 9.5 pound per gallon ("ppg") fresh water low pH mud system, comprising the multi-component additive of the present invention at approximately 6% by volume. Displacement was carried out after setting 13⅜" casing at 4,450' measured depth, with a wellbore inclination of 26 degrees.

A 12¼" open hole was then drilled to 9,601' measured depth while slightly increasing mud density to 10.0 ppg. Drilling continued to 10,026' measured depth, and mud density was increased to 11.0 ppg.

Hole angle was then increased to 52 degrees, and hole direction (azimuth) was changed by 35 degrees. Mud weight was increased to 12.8 ppg. Hole angle, direction, and mud weight was maintained to the 9⅞" casing point at 12,243' measured depth, where this casing string was successfully run.

Mud density was increased to 14.0 ppg after drilling out of the 9⅞" casing. The well was drilled to a total depth of 13,734' measured depth, and mud weight was increased to 15.5 ppg.

No lost circulation was experienced. The open hole intervals in which the additive was used required a total of 19 drilling days. Concentration of the additive was maintained at 6% by volume.

Case History No. 2

Wellbore was displaced with an 11.5 ppg low pH fresh water system comprising about 6% by volume of the additive of the present invention. The displacement was done after setting 9⅝" casing at 4,145' MD, with wellbore angle of 72 degrees.

An 8½" open hole was drilled to 9,833' measured depth while increasing mud weight to 13.8 ppg and while maintaining hole angle. Additive concentration was maintained at approximately 6% by volume, and the hole section required 10 days drilling time.

Case History No. 3

This well has a saturated salt drilling fluid system, comprising the additive of the present invention. Mud weight is 14.0 ppg, and additive concentrations have been maintained between 8% and 11% by volume for optimum rate of penetration enhancement, lubrication, and inhibition properties. Displacement to the drilling fluid of the present invention was done after setting surface case at 6,200' measured depth.

It should be appreciated that a drilling fluid system comprising the various components set forth in the principles and teachings of this inventive disclosure constitutes an advancement in the art of drilling fluid systems and their use. While the above description contains certain specifics, these should not be construed as limitations on the scope of the invention, but rather only as exemplifications of preferred embodiments thereof. Accordingly, the various elements of the invention should be understood as including alternative components and methods of their use, which those skilled in the relevant art would recognize as equivalent.

Although the preceding description sets forth many specificities, it is to be understood that same are offered for the purposes of setting forth some of the presently preferred embodiments of the invention, and not byway of limitation. Various changes can be made to the components of the invention without departing from the scope thereof. For example, the ratios of the three primary components of the additive one to the other may be varied; the overall volumetric fraction of the additive (or components thereof) within the total fluid system can be varied; different particular compositions of the individual components are possible, etc.

Therefore, the scope of the invention is not to be measured by the examples set forth herein, but by the scope of the appended claims and the legal equivalents thereof.

I claim:

1. A water based drilling fluid, for the drilling of subterranean boreholes, comprising:
   a) water as a continuous phase;
   b) a rate of penetration enhancing component comprising a synthetic, non-toxic ester-based oil;
   c) a lubrication enhancing component comprising:
      (I) a chlorinated component of chlorinated normal paraffins having 9 to 20 carbon atoms, chlorinated esters of fatty acids, chlorinated waxes, chlorinated olefins or mixtures thereof; and
      (ii) a sulfurized component of sulfurized fatty acid, sulfurized esters of fatty acids, sulfurized polymerized fatty acids, sulfurized olefins, or mixtures thereof,
      said chlorinated and sulfurized components being combined in proportions to produce a composition containing about 15 to 30 weight percent chlorine and about 2 to 10 weight percent sulfur; and
   d) a clay inhibition component comprising a polypropylene glycol,
      wherein said drilling fluid comprises about 4% by volume of rate of penetration enhancing component, 2% and 6% by volume of lubrication enhancing component, and 2% and 6% by volume of clay inhibition component.

2. The water based drilling fluid of claim 1, wherein said drilling fluid comprises about 4% by volume of rate of penetration enhancing component, 2% by volume of lubrication enhancing component, and 2% by volume of clay inhibition component.

3. The water based drilling fluid of claim 1, wherein said rate of penetration enhancing component further comprises one or more surfactants.

4. The water based drilling fluid system of claim 1, wherein said system is a fresh water based system.

5. The water based drilling fluid system of claim 1, wherein said system is a saturated salt system.

6. A drilling fluid additive for incorporation into a drilling fluid system for the drilling of subterranean boreholes, comprising:
   a) a rate of penetration enhancing component comprising a synthetic, non-toxic ester-based oil;
   b) a lubrication enhancing component comprising:
      (I) a chlorinated component of chlorinated normal paraffins having 9 to 20 carbon atoms, chlorinated esters of fatty acids, chlorinated waxes, chlorinated olefins or mixtures thereof; and
      (ii) a sulfurized component of sulfurized fatty acid, sulfurized esters of fatty acids, sulfurized polymerized fatty acids, sulfurized olefins, or mixtures thereof,
      said chlorinated and sulfurized components being combined in proportions to produce a composition containing about 15 to 30 weight percent chlorine and about 2 to 10 weight percent sulfur; and
   c) a clay inhibition component comprising a polypropylene glycol,
   wherein said rate of penetration enhancer, said lubricant, and said clay inhibitor are blended together in volumetric ratios ranges of 4 parts to 10 parts rate of penetration enhancing component; 2 parts to 6 parts lubrication enhancing component; and 2 parts to 6 parts clay inhibition component, and wherein said rate of penetration enhancing component comprises about 4% of the total system volume when said drilling fluid additive is added to a system of drilling fluid.

7. The drilling fluid additive of claim 6, wherein said rate of penetration enhancer, said lubricant, and said clay inhibitor are blended together in volumetric ratios ranges of 4 parts rate of penetration enhancing component; 2 parts lubrication enhancing component; and 2 parts clay inhibition component.

8. The drilling fluid additive of claim 6, wherein said rate of penetration enhancing component further comprises one or more surfactants.

9. The drilling fluid of Claim 1, further comprising:
   e) a weighting agent: and
   f) a gelling agent.

* * * * *